(12) United States Patent
Zheng et al.

(10) Patent No.: US 9,245,280 B2
(45) Date of Patent: Jan. 26, 2016

(54) PREDICTIVE VIDEO ADVERTISING EFFECTIVENESS ANALYSIS

(71) Applicant: Hulu, LLC, Santa Monica, CA (US)

(72) Inventors: Hua Zheng, Beijing (CN); Jean-Paul Colaco, Manhattan Beach, CA (US); Noelle Huynh, Los Angeles, CA (US); Joyce Zhang, Beijing (CN); Xuan Wei, Beijing (CN)

(73) Assignee: HULU, LLC

( * ) Notice: Subject to any disclaimer, the term of this patent is extended or adjusted under 35 U.S.C. 154(b) by 0 days.

(21) Appl. No.: 13/958,278

(22) Filed: Aug. 2, 2013

(65) Prior Publication Data

US 2014/0040019 A1    Feb. 6, 2014

Related U.S. Application Data

(60) Provisional application No. 61/679,622, filed on Aug. 3, 2012.

(51) Int. Cl.
   *G06Q 30/02*    (2012.01)

(52) U.S. Cl.
   CPC ........ *G06Q 30/0246* (2013.01); *G06Q 30/0251* (2013.01)

(58) Field of Classification Search
   CPC .................................................. G06Q 30/0246
   USPC ........................................................ 14/14.45
   See application file for complete search history.

(56) References Cited

U.S. PATENT DOCUMENTS

| | | | | |
|---|---|---|---|---|
| 7,051,442 B2* | 5/2006 | McCambridge | ........ | B26B 19/20 30/233 |
| 7,051,443 B2* | 5/2006 | Mueller | ................... | B26B 29/02 30/125 |
| 7,051,445 B1* | 5/2006 | Karapetyan | .............. | G01C 1/00 33/278 |
| 7,051,446 B2* | 5/2006 | Moss | ....................... | B25H 7/00 33/414 |
| 7,051,455 B2* | 5/2006 | Bedford | ..................... | A61L 9/01 34/416 |
| 8,346,801 B2* | 1/2013 | Hagg | ................ | G06F 17/30781 707/728 |
| 2007/0255618 A1* | 11/2007 | Meerbergen | ........... | G06Q 30/02 705/14.46 |
| 2010/0250585 A1* | 9/2010 | Hagg et al. | ..................... | 707/769 |
| 2011/0238487 A1* | 9/2011 | Chang | .............. | G06Q 10/06375 705/14.42 |
| 2011/0251896 A1* | 10/2011 | Impollonia et al. | ........ | 705/14.55 |
| 2012/0004983 A1* | 1/2012 | Borthwick | ............. | G06Q 30/02 705/14.45 |
| 2012/0304223 A1* | 11/2012 | Sargent | ............ | H04N 21/44016 725/32 |
| 2012/0310729 A1* | 12/2012 | Dalto | ..................... | G06Q 30/02 705/14.43 |
| 2013/0006758 A1* | 1/2013 | Hegeman et al. | .......... | 705/14.46 |
| 2013/0346154 A1* | 12/2013 | Holz | ...................... | G06Q 30/02 705/7.31 |

OTHER PUBLICATIONS

Hoaglin (NPL: The Hat Matrix in Regression and ANOVA, The American Statistician, vol. 32 No. 1 Feb. 1978 pp. 17-22).*

* cited by examiner

*Primary Examiner* — Thomas M Hammond, III
*Assistant Examiner* — Breffni X Baggot
(74) *Attorney, Agent, or Firm* — Fountainhead Law Group PC

(57) ABSTRACT

Effectiveness of video content is predicted using an automated or semi-automated analysis process operating on a computer. Video content is analyzed using image and audio data processing to assign a collection of attributes to a video ad. The collection of attributes is correlated to a historical effectiveness (e.g., click-thru rate) of past video ads in the same or similar attribute space to obtain predicted ad effectiveness. Differences between the collection of attributes and historical attribute spaces of greater effectiveness may also be determined and reported in the form of suggestions for improving the effectiveness of the ad.

20 Claims, 14 Drawing Sheets

| | Metadata 452 | | Inferred attributes 454 | | Stats 456 | | Relationship 458 |
|---|---|---|---|---|---|---|---|
| | Brand | Advertiser | Category | Tone-Sexy | Asset-Baby | Clicks | Recall | Related Segments | ... |
| AdID1 | Puris | Toyota | Vehicles | 0 | 1 | 12345 | ... | Auto Buyers | ... |
| AdID2 | iPhone | Apple | Electronics | 0 | 0 | 45678 | ... | Mobile Users | ... |
| AdID3 | Xbox | Microsoft | Electronics | 1 | 1 | 98763 | ... | Gamers | ... |
| ... | | | | ... | ... | ... | ... | ... | ... |
| ... | | | | | | | | | |

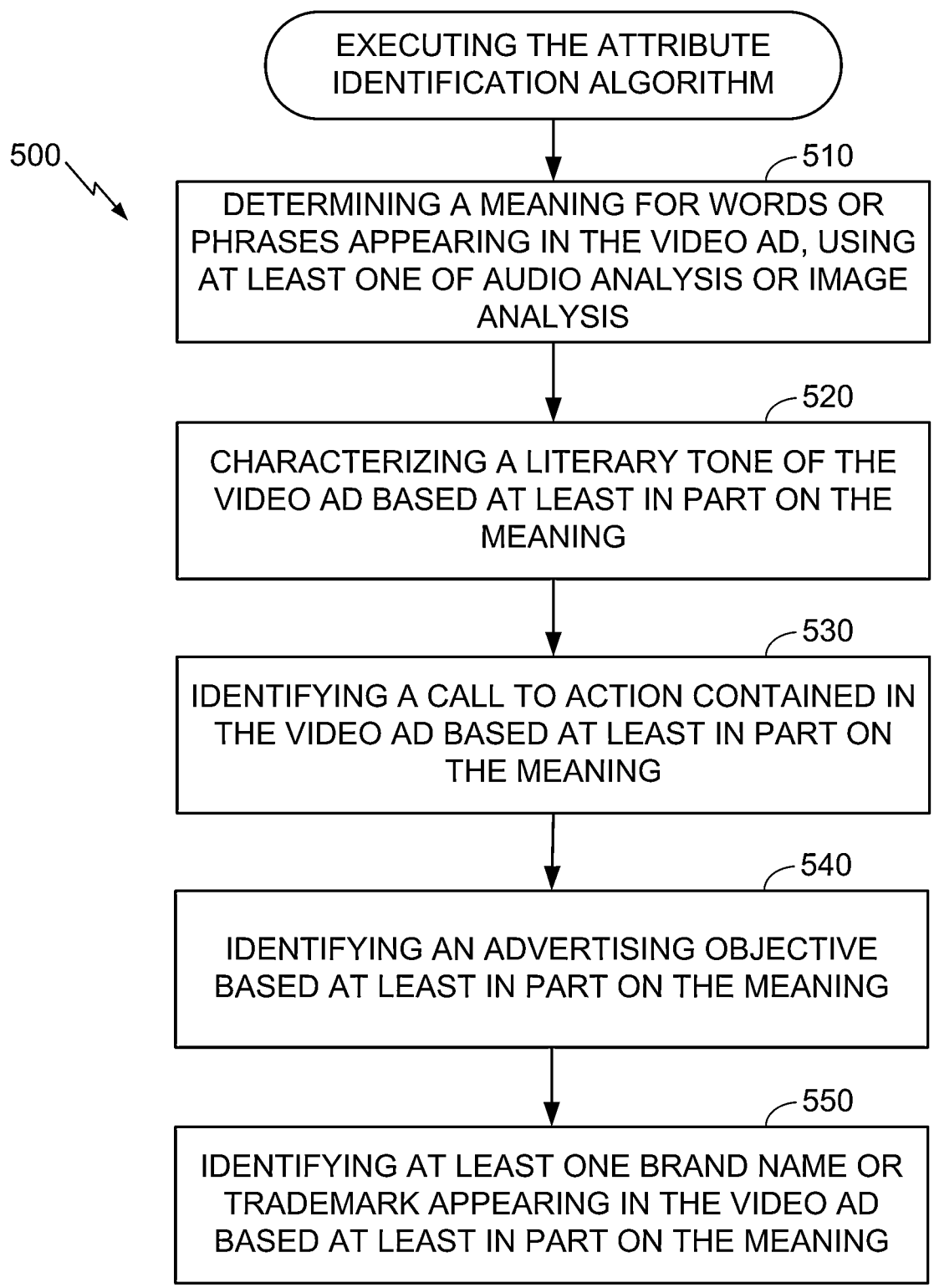

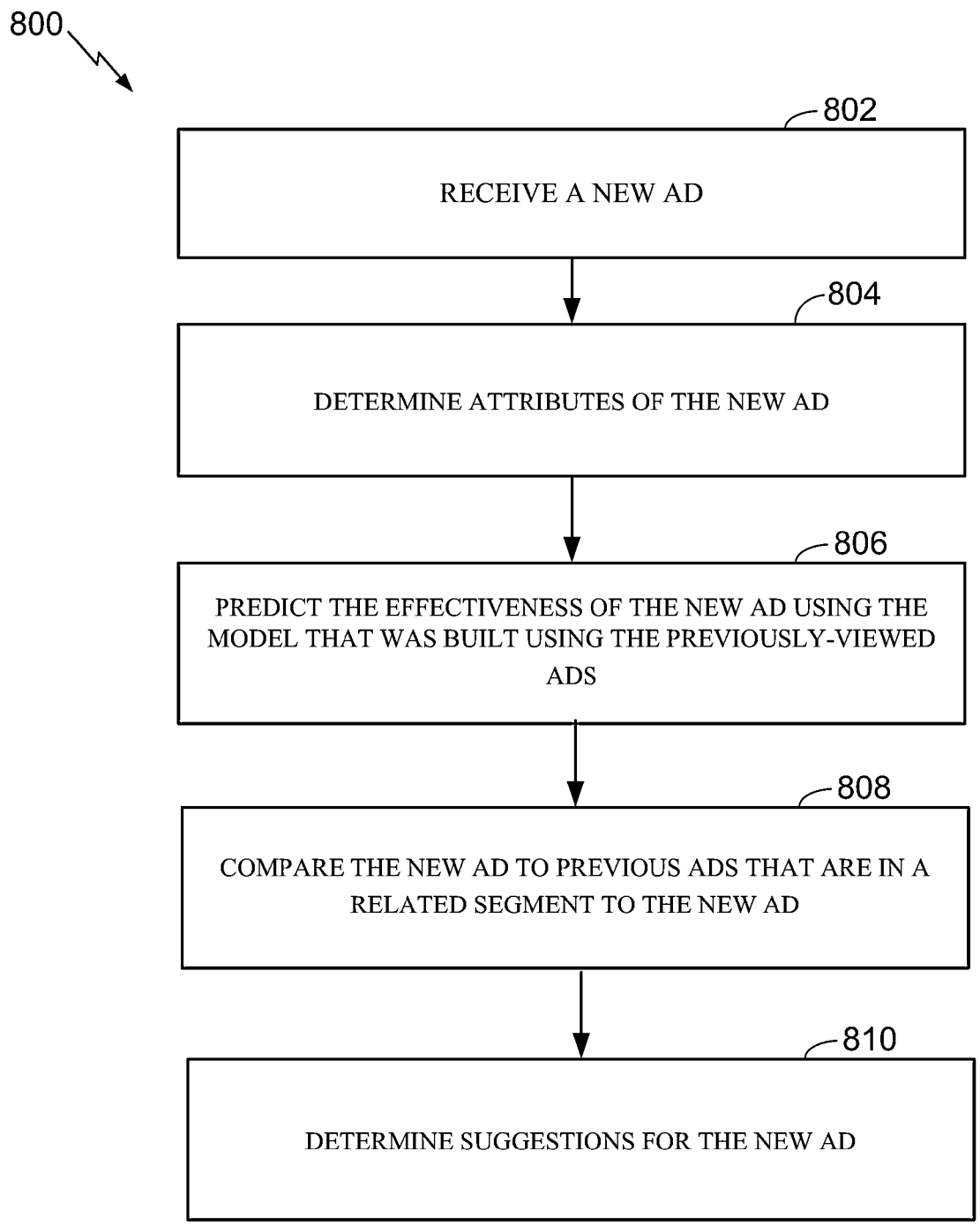

PREDICTIVE VIDEO ADVERTISING EFFECTIVENESS ANALYSIS

CROSS REFERENCE TO RELATED APPLICATIONS

The present disclosure claims priority to U.S. Provisional App. No. 61/679,622, entitled "PREDICTIVE VIDEO ADVERTISING EFFECTIVENESS ANALYSIS", filed Aug. 3, 2012, the contents of which is incorporated herein by reference in its entirety.

FIELD

The present application relates generally to input/output processing using a computer, and more particularly to analysis methods and systems for automatically predicting the effectiveness of video advertising.

BACKGROUND

Since the advent of the television, video advertising has become widespread to the point of becoming an almost ubiquitous way to communicate with consumers and influence consumer behavior. The importance of video advertising has continued and grown considerably with the growth of alternative platforms for consuming video content available through wide area networks, such as the Internet, and broadband wireless communications networks. Alternative platforms may include, for example, online video streaming sites and online video downloading sites. Such platforms may provide greater convenience, choice, and flexible scheduling of video content without requiring the use of additional appliances such as digital video recorders by the consumer. Both traditional and alternative platforms for video content are commonly funded, at least in part, by selling video advertising to various advertisers.

The production of video advertising may be relatively time-consuming and expensive compared to other advertising forms. In addition, effective distribution and targeting of video advertising may add considerable costs to an advertising budget. Advertisers naturally want to obtain the best possible results for the considerable investment in video advertising campaigns, and the development of effective video advertising is of great and increasing importance to advertisers. At the same time, factors such as increasing diversity and competition, cultural changes, faster advertising cycles, and technological innovation may make it difficult to predict the effectiveness of a particular video advertisement or campaign. Therefore, some video advertising or campaigns may not be as effective as possible for a given advertised product or service.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology. Like element numerals may be used to indicate like elements appearing in one or more of the figures.

FIG. 4D shows an example of stored information for previously-viewed video ads according to one embodiment.

FIG. 5 shows additional operations in connection with executing the identification algorithm.

FIG. 8A depicts a simplified flowchart for analyzing new ads according to one embodiment.

DETAILED DESCRIPTION

Figure 1:
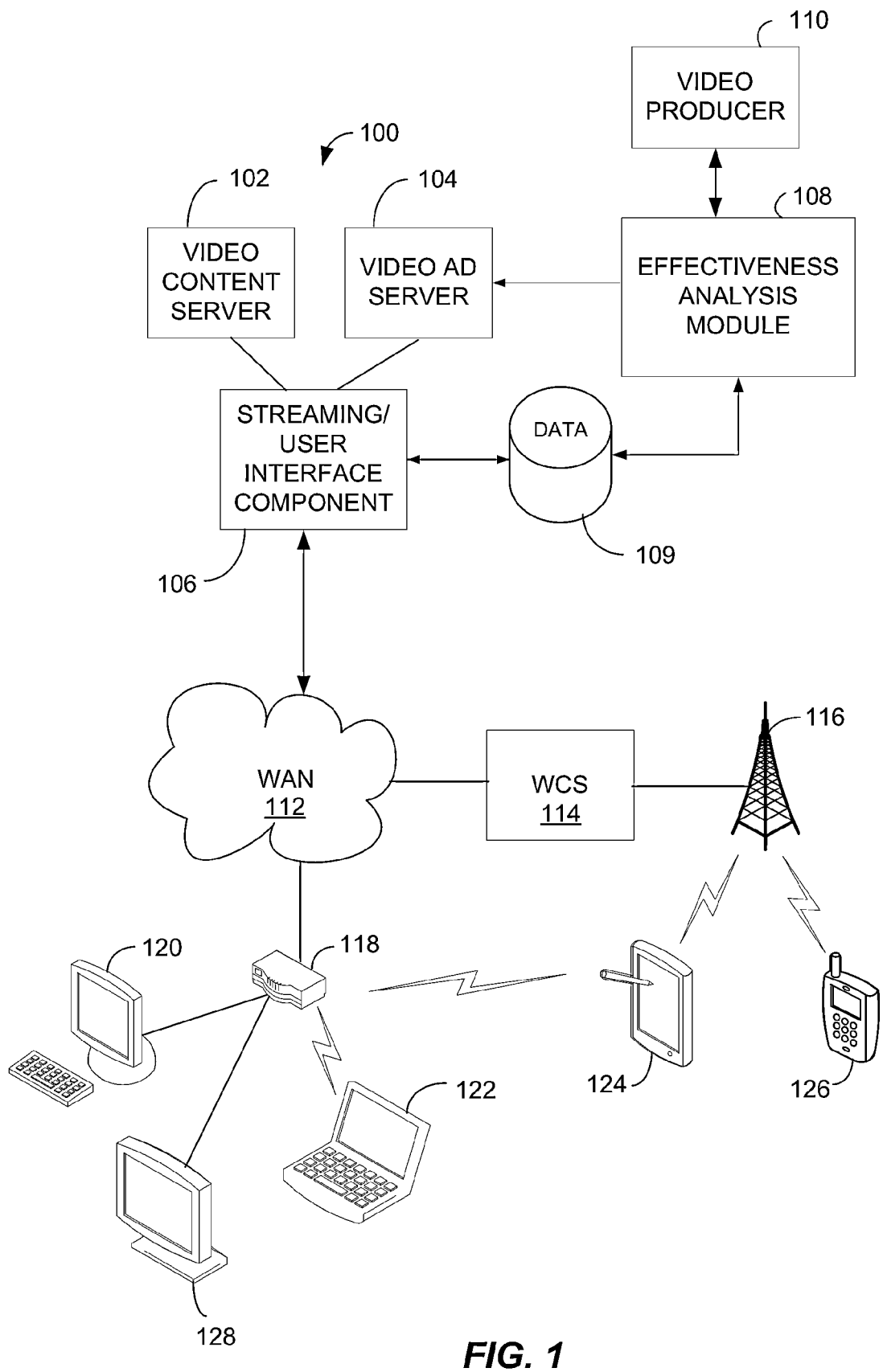
FIG. 1 is a schematic diagram illustrating an embodiment of a computing environment in which systems and methods discussed herein may be implemented.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

Features and aspects as disclosed herein may be implemented in conjunction with a video streaming system 100 in communication with multiple client devices via one or more communication networks. Aspects of the video streaming system 100 are described merely to provide an example of an application for video advertising effective analysis according to the present disclosure. It should be appreciated that the present technology is not limited to streaming video applications, and may be adapted for other applications.

Video advertising may be obtained from one or more sources for example, from a video producer 110, for use as input to a process for analyzing and tracking effectiveness of video advertising. The video producer 110 may comprise, for example, a network computer in secure communication with the effectiveness analysis module 108 via a secure administrative back-end component. The present methods may include both prospective methods for predicting effectiveness of video advertising, and retrospective methods for tracking and measuring effectiveness of video advertising. In a video streaming format, metrics for tracking effectiveness of video advertising may be expressed, for example, as a Click-Through Rate (CTR). A CTR may be expressed as a ratio of the number of times an interactive object associated with a video ad (e.g., a "learn more" icon) is selected by an end user to the number of times the video ad is played. Other methods may include, for example, sell-through rates, referral rates, and recall (e.g., brand, message recall). Recall metrics quantify the net impact of advertising. General recall measures the percentage of users who recalled the ad, brand recall measures the percentage of users that recalled the ad and the ad's brand, message recall measures the percentage of users that recalled the brand and understood the ad's message, and likeability measures the percentage of users who recalled the brand and liked the ad. Video advertising may comprise raw or edited frame-based video data in any suitable digital format, for example, MPEG-1, MPEG-2, MPEG-4, VC-1, or other format, typical in formatted as a clip of definite length (e.g., 10, 30 or 60 seconds). In an alternative, or in addition, video advertising may be provided in a non-digital format and converted to digital format using a scanner and/or transcoder.

Input video advertising may be provided to an effectiveness analysis module 108 for an initial effectiveness review. The module 108 may be implemented by a computer, for example, one or more computers configured with an effectiveness analysis application and hardware as described herein. The module 108 may be configured to receive video data, and process the video data using one or more automatic or semi-automatic processes as described herein to provide a quantitative or semi-quantitative predictive estimates of the effectiveness of video advertising. For example, the module 108 may provide an estimated CTR for a particular video advertisement for one or more target demographic groups, optionally with a breakdown explaining the basis for the estimate and/or identifying one or more attributes of the video that may be changed to improve estimated effectiveness. In response to the estimated effectiveness returned by the analysis module 108, the video producer 110 may release, or decline to release, the video advertisement for an advertising campaign.

The module 108 may provide a video advertisement to a video ad server 102 of the video streaming system 102, optionally in response to receiving a signal releasing the ad from the video producer 110. In addition, the module 108 may store the results of the video effectiveness analysis in a memory, for example, data store 109.

The video streaming system 100 may include one or more computer servers or modules 102, 104, and/or 106 distributed over one or more computers. Each server 102, 104, 106 may include, or may be operatively coupled to, one or more data stores 109, for example databases, indexes, files, or other data structures. A video content server 102 may access a data store (not shown) of various video segments. The video content server 102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 104 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 100, a public service message, or some other information. The ad server 104 may serve the video advertising segments as directed by a user interface controller (not shown).

The video streaming system 100 may further include an integration and streaming component 106 that integrates video content and video advertising into a streaming video segment. A controller (not shown) may determine the selection or configuration of advertising in the streaming video based on any suitable algorithm or process. The component 106 may also track the effectiveness of each video ad, for example by recording click-through and ad play events in a database 109.

The video streaming system 100 may include other modules or units not depicted in FIG. 1, for example administrative servers, commerce servers, network infrastructure, advertising selection engines, and so forth.

The video streaming system 100 may connect to a data communication network 112. A data communication network 112 may comprise a local area network (LAN), a wide area network (WAN), for example, the Internet, a telephone network, a wireless cellular telecommunications network 114, or some combination of these or similar networks.

One or more client devices may be in communication with the video streaming system 100, via the data communication network 112 and/or other network 114. Such client devices may include, for example, one or more laptop computers 122, desktop computers 120, "smart" mobile phones 126, notepad devices 124, network-enabled televisions 128, or combinations thereof, via a router 118 for a LAN, via a base station 116 for a wireless telephony network 114, or via some other connection. In operation, such client devices 120, 122, 124, 126, or 128 may send and receive data or instructions to the system 100, in response to user input received from user input devices or other input. In response, the system 100 may serve video segments and metadata from the data store 109 responsive to selection of interactive links to the client devices 120, 122, 124, 126, or 128 and customize the additional content based on parameters of the client devices, for example respective geographic locations of the client devices, or demographic information concerning respective users of the client devices. The devices 120, 122, 124, 126, or 128 may output interactive video content from the streaming video segment and video advertising using a display screen, projector, or other video output device, and receive user input for interacting with the advertising based on one or more links appearing in the video content.

Distribution of audio-video data may be implemented from component 106 to remote client devices over computer networks, telecommunications networks, and combinations of such networks, using various methods, for example progressive downloading or streaming. In streaming, a server streams audio-video data continuously to a media player component operating at least partly on the client device, which may play the audio-video data concurrently with receiving the streaming data from the server. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Unlike the web server, the streaming media server may communicate with the client device using control messages and data messages to adjust to changing network conditions as the video is played. These control messages can include commands for enabling control functions such as fast forward, fast reverse, pausing, or seeking to a particular part of the file at the client.

Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user device at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program. Streaming media players do not rely on buffering to provide random access to any point in the media program. Instead, this is accomplished through the use of control messages transmitted from the media player to the streaming media server.

The delivery of video content by streaming or progressive download may be accomplished under a variety of models. In one model, the user pays for the viewing of each video program, for example, using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Output from a media player on the client device may occupy only a portion of total screen area available on a client device, particularly when bandwidth limitations restrict the resolution of streaming video. Although media players often include a "full screen" viewing option, many users prefer to watch video in a display area smaller than full screen, depending on the available video resolution. Accordingly, the video may appear in a relatively small area or window of an available display area, leaving unused areas. A video provider may occupy the unused area with other content or interface objects, including additional advertising, such as, for example, banner ads. Banner ads or similar additional content may be provided with links to an additional web site or page, so that when a user "clicks on" or otherwise selects the banner ad, the additional web site or page opens in a new window. User interaction with such additional content may also be tracked as a way of measuring the effectiveness of video advertising appearing during a video streaming program or session.

Figure 2:
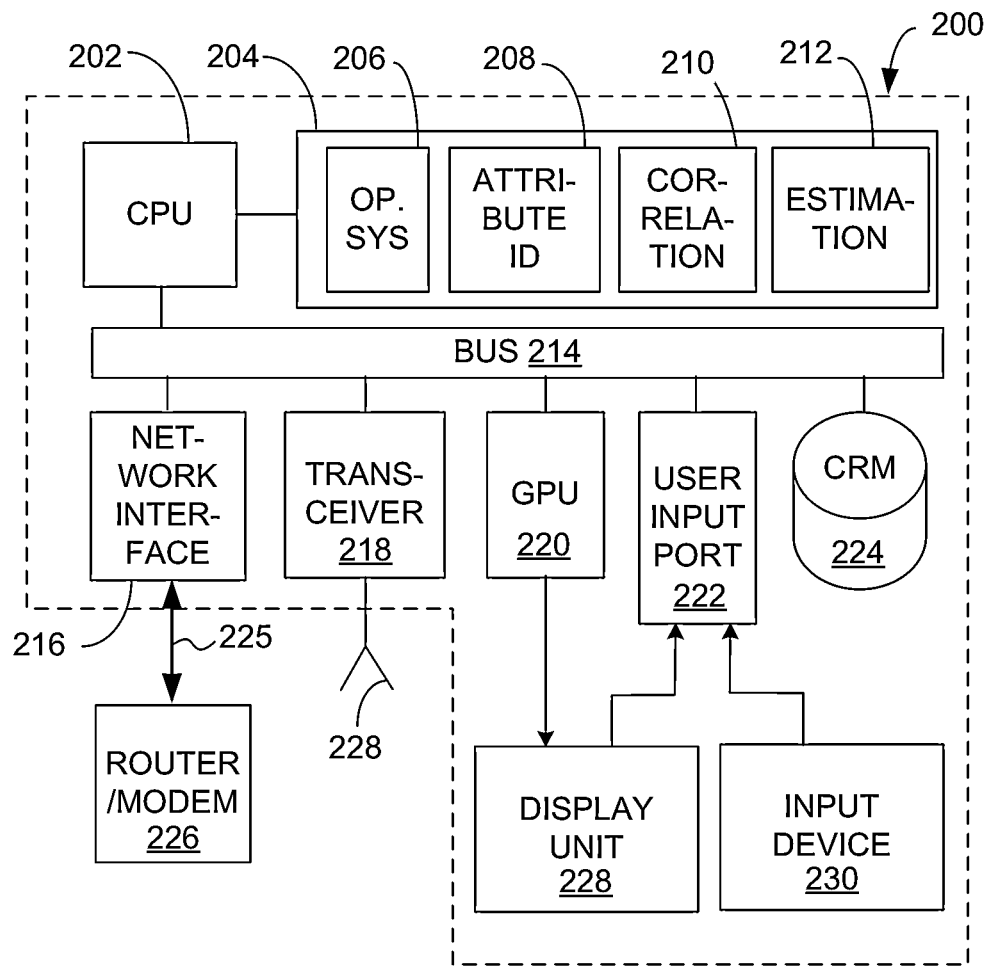
FIG. 2 is a schematic block diagram illustrating an embodiment of a computer for supporting and executing the systems and methods described herein.

Referring to FIG. 2, a diagrammatic view of a server apparatus 200 for predictive video effectiveness analysis 200 is illustrated. In selected embodiments, the apparatus 200 may include a processor 202 operatively coupled to a processor memory 204, which holds binary-coded functional modules for execution by the processor 202. Such functional modules may include an operating system 206 for handling system functions such as input/output and memory access. The modules may include an attribute identification module 208 for processing image frames of video data to detect specific attributes appearing in one or more image frames and audio data to detect specific attributes in the audio. The module 208 may include sub-modules or functions as described herein. The modules may further include a correlation module 210 for correlating the video ad to one or more past video ads, based on the attributes of the video ad. The modules may further include an estimation module 212 for estimating an effectiveness of the video ad, based on a measured effectiveness of the one or more past video ads. The memory 204 may hold additional modules not shown in FIG. 2, for example modules for performing other operations described elsewhere herein.

A bus 214 or other communication component may support communication of information within the apparatus 200. The processor 202 may be a specialized or dedicated microprocessor configured to perform particular tasks in accordance with the features and aspects disclosed herein by executing machine-readable software code defining the particular tasks. Processor memory 204 (e.g., random access memory (RAM) or other dynamic storage device) may be connected to the bus 214 or directly to the processor 202, and store information and instructions to be executed by a processor 202. The memory 204 may also store temporary variables or other intermediate information during execution of such instructions.

A computer-readable medium in a storage device 224 may be connected to the bus 214 and store static information and instructions for the processor 202; for example, the storage device 224 may store the modules 206, 208, 210 and 212 when the apparatus 200 is powered off, from which the modules may be loaded into the processor memory 204 when the apparatus 200 is powered up. The storage device 224 may include a non-transitory computer-readable medium holding information, instructions, or some combination thereof, for example instructions that when executed by the processor 202, cause the apparatus 200 to perform one or more operations of a method as described herein.

A communication interface 216 may also be connected to the bus 214. The communication interface 216 may provide or support two-way data communication between the apparatus 200 and one or more external devices, e.g., the streaming system 100, optionally via a router/modem 226 and a wired or wireless connection 225. In the alternative, or in addition, the apparatus 200 may include a transceiver 218 connected to an antenna 228, through which the apparatus 200 may communicate wirelessly with a base station for a wireless communication system or with the router/modem 226. In the alternative, the apparatus 200 may communicate with a content serving system 100 via a local area network, virtual private network, or other network. In another alternative, the apparatus 200 may be incorporated as a module or component of the system 100 and communicate with other components via the bus 214 or by some other modality.

The apparatus 200 may be connected (e.g., via the bus 214 and graphics processing unit 220) to a display unit 228. A display 228 may include any suitable configuration for displaying information to an operator of the apparatus 200. For example, a display 228 may include or utilize a liquid crystal display (LCD), touchscreen LCD (e.g., capacitive display), light emitting diode (LED) display, projector, or other display device to present information to a user of the apparatus 200 in a visual display.

One or more input devices 230 (e.g., an alphanumeric keyboard, microphone, keypad, remote controller, game controller, camera or camera array) may be connected to the bus 214 via a user input port 222 to communicate information and commands to the apparatus 200. In selected embodiments, an input device 230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 228, for example using a touch sensitive screen. A cursor control device may communicate direction information and command selections to the processor 202 and control cursor movement on the display 228.

Figure 3:
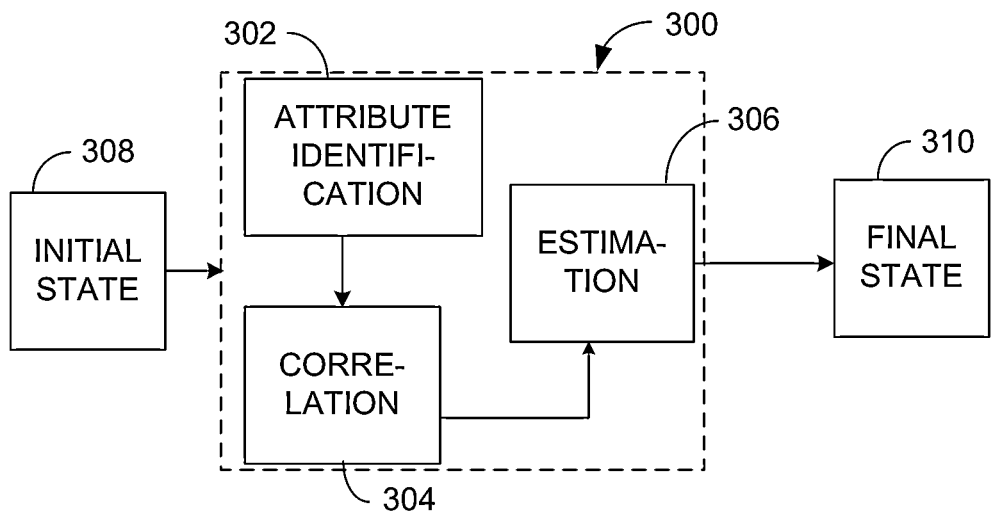
FIG. 3 is a state diagram illustrating general aspects of a process for predictive video advertising effectiveness analysis.

Referring to FIG. 3, general aspects of a process 300 used for predictive advertising effectiveness analysis based on objects appearing in image frames of the video data. The initial state 308 represents a segment of video advertising associated with an unknown, default, or null effectiveness estimation. As such, the initial state correlates to a definite video output from a display device, i.e., a physical state, making up the video advertisement associated with an unknown, default, or null effectiveness estimation. The initial state 308 may be represented in a computer memory using an electronic video data format with metadata.

The process 300 is (or includes) an input-output computation process performed by a computer processor, which operates on the initial state 308 to output at least one final state 310. The process 300 may be implemented automatically with limited or no input from a human operator. In the alternative, in some embodiments, the process 300 may receive inputs from one or more human operators to perform selected tasks, for example quality control tasks. The final state 310 represents the video data associated with at least one metadata information element developed from an automatic or semi-automatic effectiveness analysis process 300. The process 300 may therefore operate as a state machine that accepts the initial state 308 and optionally user input via an input device as inputs, and transforms the state data 308 representing a physical state of a video output device with an undefined metadata value into a different final state 310 representing the physical state of a video output device with a defined metadata value for advertising effectiveness. Subsequently, the final output state 310 is realized in physical output from a client device that is configured based on the final output state to provide advertising video content.

The process 300 may include several interactive modules, for example, an attribute identification module 302, a correlation module 304 and an effectiveness estimation module 306. The module 300 may include other modules, for example, a user interface module, communication module, graphics module, etc., which for illustrative simplicity are not shown.

Example Methodologies and Apparatus

The foregoing examples and details may be embodied in one or more methodologies performed by a computer, for example a client device, server, or some combination of a client device and server. Methodologies that may be implemented in accordance with the disclosed subject matter will be better appreciated with reference to various flow charts. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method could alternatively be represented as a series of interrelated states or events, such as in a state diagram.

Figure 4A:
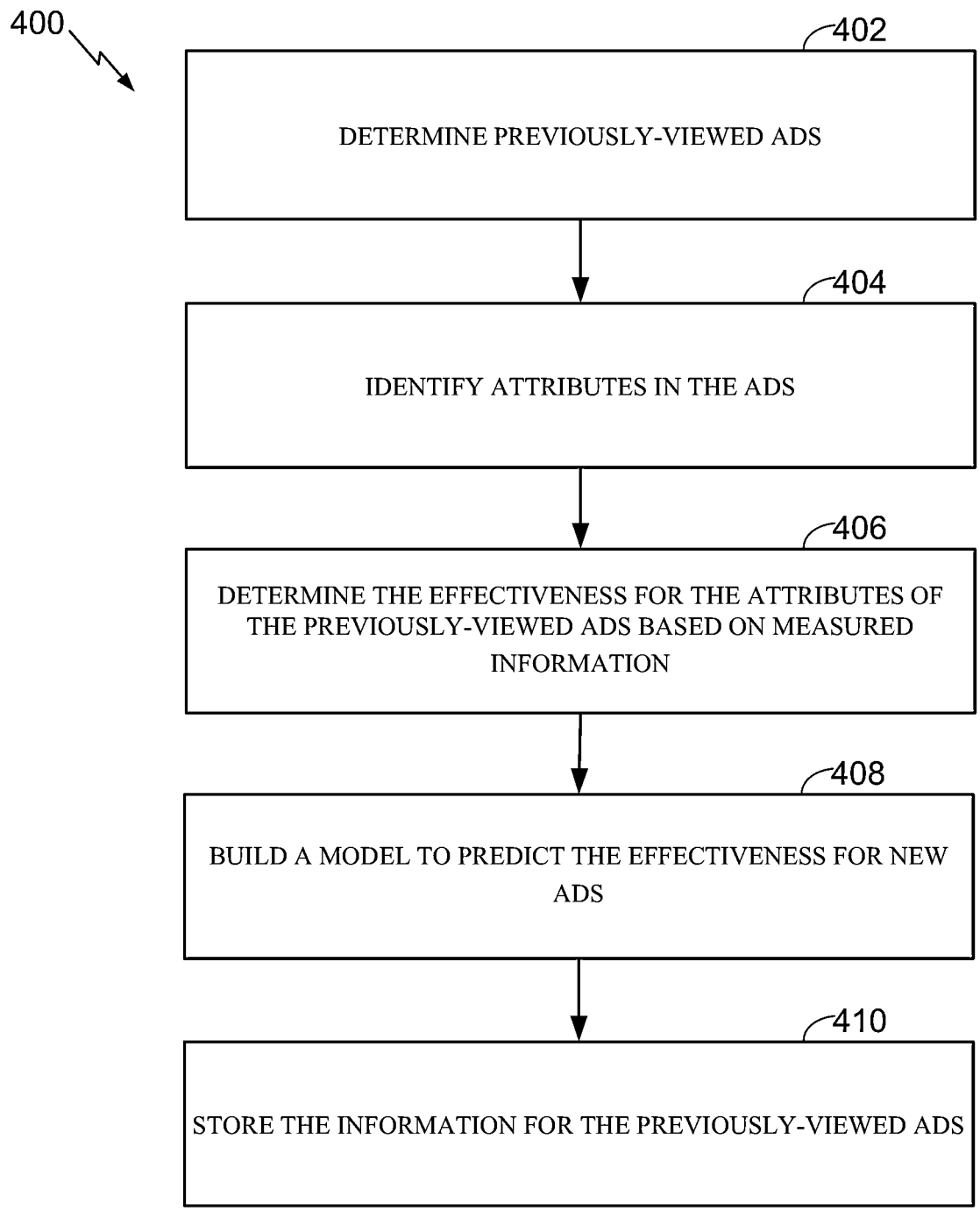
FIG. 4A depicts a simplified flowchart of a method for analyzing previously-viewed video ads according to one embodiment.

FIG. 4A depicts a simplified flowchart 400 of a method for analyzing previously-viewed video ads according to one embodiment. Previously-displayed ads are analyzed to determine which creative components of ads are most effective, such as in driving action to the advertiser's site when the ads are viewed during the sending of videos to users. The creative attributes found in the highest and lowest performing ads are determined and are then used to determine the effectiveness of new ads.

At 402, analysis module 108 determines previously-viewed video ads. For example, ads that have been viewed during a certain time period, such as in the last month, couple months, year, two years, may be determined and analysis module 108 analyzes these ads.

Figure 4B:
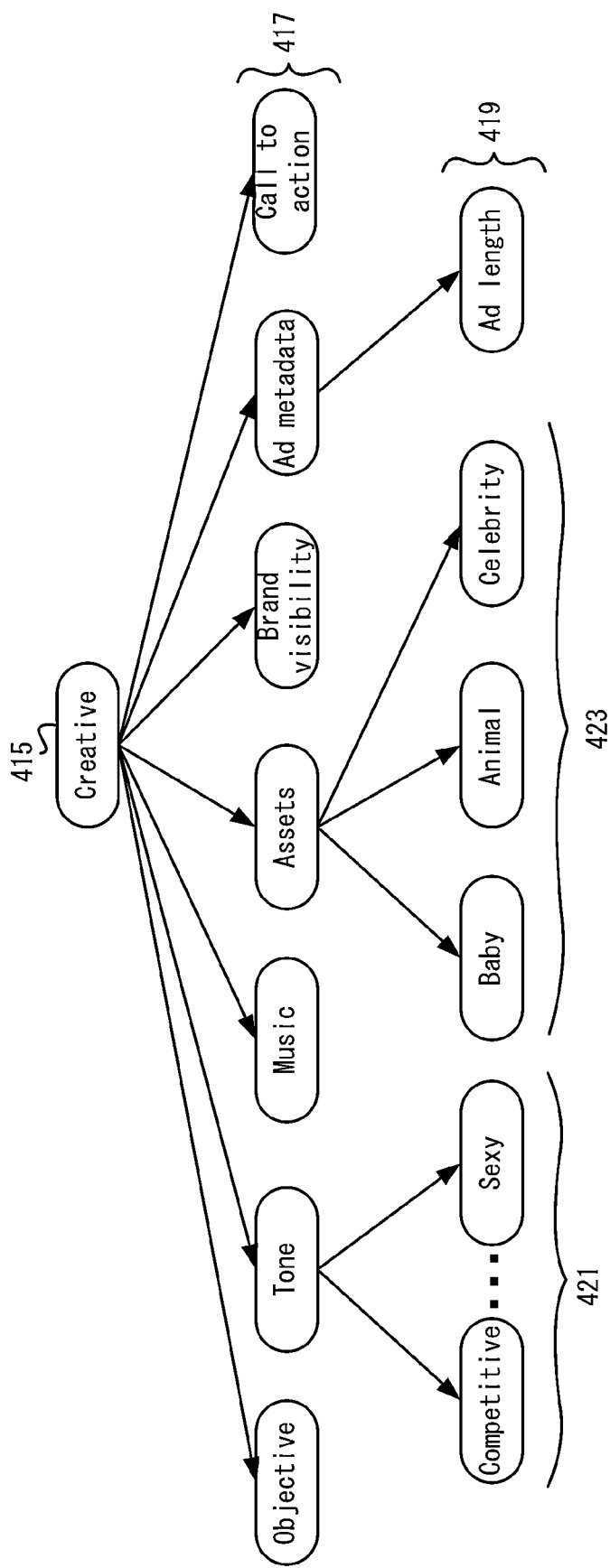
FIG. 4B shows an example of an ad taxonomy of attributes according to one embodiment.

At 404, analysis module 108 identifies attributes in the ads. The attributes may be identified using automatic identification processes, such as visual analysis and/or audio analysis. For example, visual analysis may include text analysis to recognize the text in an ad and also facial recognition to recognize the faces in the ad. Also, audio analysis may be used to recognize music and tone attributes. FIG. 4B shows an example of an ad taxonomy of attributes according to one embodiment. The site may determine which attributes have an effect on the effectiveness of an ad. For example, the site may define different attributes and test whether these attributes have an effect on effectiveness of ads.

A parent node shown at 415 represents the top level for the ad attributes. In this case, the node at 415 is the creative attributes of the video ads.

In a level shown at 417, various attribute categories include objective, tone, music, assets, brand visibility, ad metadata, and call-to-action categories. The objective may be what the ad is targeted to. The tone may be the tone of the ad. Music may be the music that is included in the ad. Assets may be certain content that may be included in the ad. Brand visibility may be how visible a brand is in the ad. Ad metadata may include various information about the ad. A call-to-action may be information included in the ad that requests an action to be performed by the user.

Figure 4C:
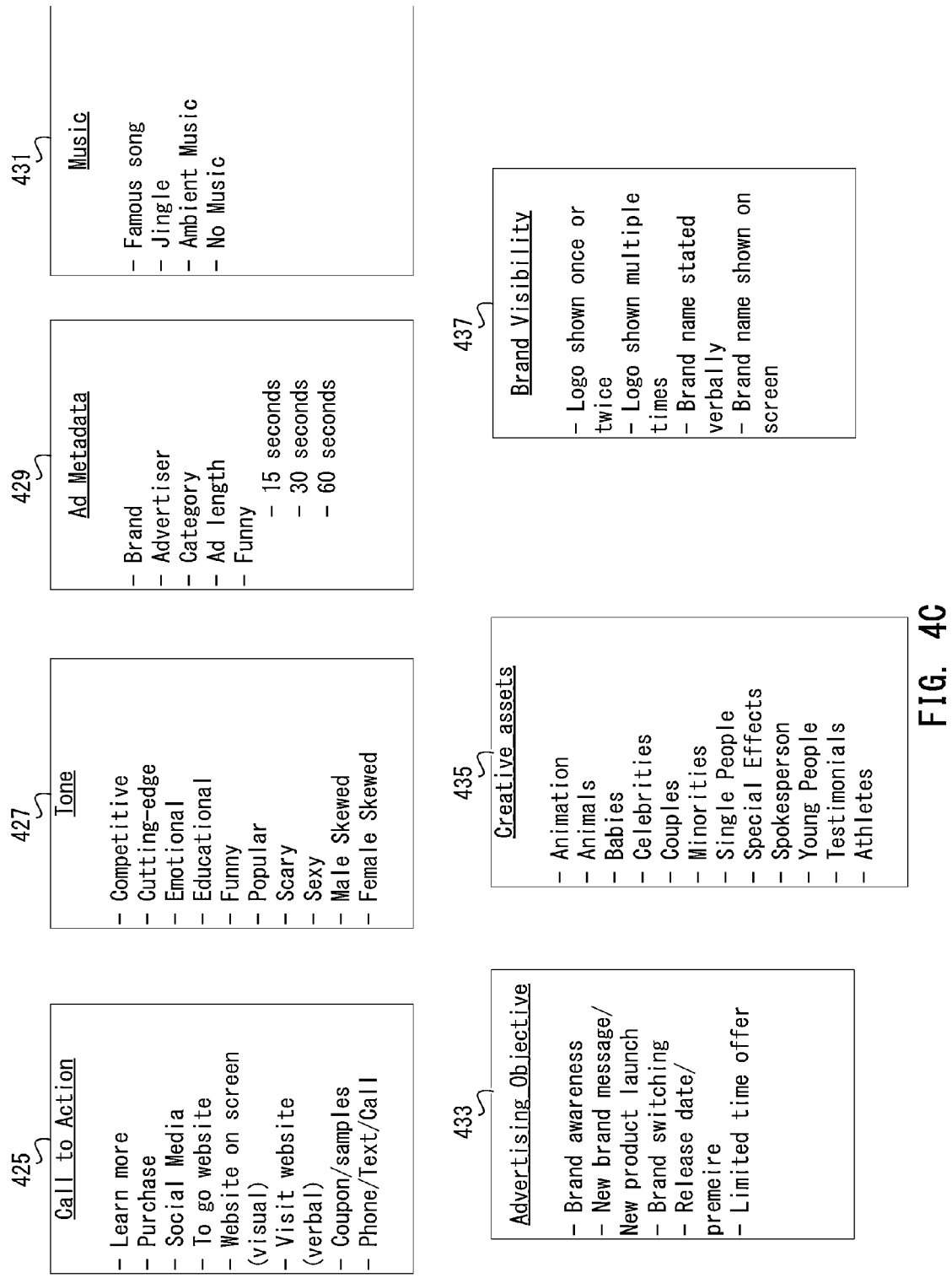
FIG. 4C shows additional attributes that can be associated with various attribute categories according to one embodiment.

In a level 419, the various attribute categories are broken down into additional attributes. For example, at 421, the tone category is broken down into attributes from competitive to sexy, and at 423, the assets category is broken down into the attributes of baby, animal, and celebrity. Although these attributes are shown, other attributes may be appreciated. For example, FIG. 4C shows additional attributes that can be associated with various attribute categories according to one embodiment. For example, the call-to-action category may include: learn more; purchase; social media; go to website; website on screen (visual); visit website (verbal); coupon/samples; and phone/text/call attributes. The call-to-action attributes may be detected using visual analysis automatically. For example, optical character recognition (OCR) may recognize text inside the ad and determine this is a call-to-action, such as a website link may be displayed in the ad and detected using OCR. Analysis module 108 may detect that this is a link and determine that the link is a call-to-action to go to the website. Phone numbers may also be detected via OCR. Analysis module 108 may input the detected visual information into a machine-learning algorithm that predicts whether the text is a call-to-action. For example, numbers in the format of a phone number may be determined as calls-to-action.

At 427, the attributes for the tone category are shown. These attributes include competitive, cutting edge, emotional, educational, funny, popular, scary, sexy, male-skewed, and female-skewed attributes. Analysis module 108 detects the tone by analyzing the text and/or audio in the ad. For example, the audio may yield information on whether the tone of the ad is scary or sexy. Further, analysis of the text or audio may indicate whether the tone of the ad is funny, educational, emotional, etc.

At 429, ad metadata attributes are shown. The ad metadata attributes include brand, advertiser, category, and ad length. The ad length attribute may be determined by analyzing how long the ad runs. Additionally, the brand, advertiser, and category may be determined based on various information shown in the ad or by analyzing the text of the ad. For example, analysis module 108 determines the brand of the ad based on a picture or text of the name of the company in the ad. The advertiser and the category may be determined based on the brand or text of the ad.

At 431, the music attribute category is shown. The music attributes include famous song, jingle, ambient music, and no music. Analysis module 108 uses an audio analysis of any music in the ad to determine the attribute. For example, audio analysis may be able to recognize whether a song is famous or not.

At 433, the advertising objective attribute category is shown. The advertising objective attributes include brand awareness, new brand message/new product launch, brand switching, release date/premiere, and limited-time offer. Analysis module 108 determines the ad objective by automatically analyzing the content of the ad. Additionally, a user may input information for the advertising objective. For example, a user may input that the ad is for a new brand message or new product launch. In another case, analysis module 108 analyzes the ad content to determine that this is a new product launch, such as the ad may indicate that this is a new product.

At 435, the creative assets attribute category is shown. The creative assets attributes include animation, animals, babies, celebrities, couples, minorities, single people, special effects, spokesperson, young people, testimonials, and athletes. Analysis module 108 detects the creative assets attributes using visual analysis. For example, facial recognition may be used to recognize celebrities in the ads. Further, visual analysis may be used to recognize animals, such as dogs and cats, couples, babies, etc.

At 437, the brand visibility attributes category is shown. The brand visibility attributes include logo shown once or twice, logo shown multiple times, brand names stated verbally, and brand names shown on screen. Analysis module 108 may determine the brand visibility attributes using visual analysis. For example, the visual analysis may count the number of times a logo is shown in the ad.

Although the above attributes are described, it will be understood that additional attributes may be appreciated.

Referring back to FIG. 4A, at 406, analysis module 108 determines the effectiveness for the attributes of the previously-viewed video ads based on measured information. For example, when the ads were displayed, information is measured for the ads, such as click-through rate, brand recall, etc.

At 408, analysis module 108 builds a model to predict the effectiveness for new ads. A new ad may be an ad that effectiveness has not been measured, such as an ad that has not been shown or released. A new ad may also be any ad in which predicting effectiveness is desired. The model may be able to predict from attributes in a new ad what the effectiveness of the new ad may be based on the previously-viewed video ads. The model determines the effect on the effectiveness of the new ad by quantifying the impact of attributes on the effectiveness. For example, the model may determine that a call to action attribute increases the effectiveness by 5% from the aggregate effectiveness. The model may be a machine-learning model, which will be described in more detail below.

At 410, analysis module 108 stores the information for the previously-viewed video ads. FIG. 4D shows an example of stored information for previously-viewed video ads according to one embodiment. In a column 450, various ads are listed, such as AdID1, AdID2, AdID3, etc. In columns 452, metadata for the ads are shown. For example, the brand, advertiser, and category for each ad are shown. These attributes may be automatically detected or input by a user. For example, in AdID1, the brand may be detected via text recognition, the advertiser via metadata or text recognition, and the category determined based on the brand, advertiser, or visual analysis of objects being displayed in the ad.

In columns 454, inferred attributes are shown. For example, these attributes may be detected via visual or audio analysis. Any number of attributes may be included for the inferred attributes. In this case, the tone-sexy and asset-baby attributes are included. Whether or not each ad includes these attributes is input into the table. For example, AdID1 does not have a sexy tone and a value of "0" is input for this attribute. However, AdID1 does have a baby asset included in the ad and this column includes a value of "1". The values of 0 and 1 indicate whether the attribute is not included in the ad and included in the ad, respectively. AdID2 does not include either of these assets, but AdID3 includes both of these attributes.

In column 456, measured statistics for the previously-viewed video ads are shown. For example, the number of clicks each ad received while being displayed is stored in the clicks column and whether the ads were rated for recall is stored in the recall column. As shown, AdID1 had 12345 clicks, AdID2 had 45678 clicks, and AdID3 had 98763 clicks. These ads were not scored for any recall, however.

In columns 458, the relationship of the ad is shown. For example, related segments for the ads are included. These related segments relate the ad to which audience might be relevant for the ad. For example, auto buyers may be interested in AdID1, mobile users may be interested in AdID2, and gamers may be interested in AdID3. The related segments may be automatically determined and manually input. The related segments are used when analyzing new ads. For example, when an ad is associated with auto buyers, then AdID1 may be used to predict the effectiveness of the new ad.

Figure 4E:
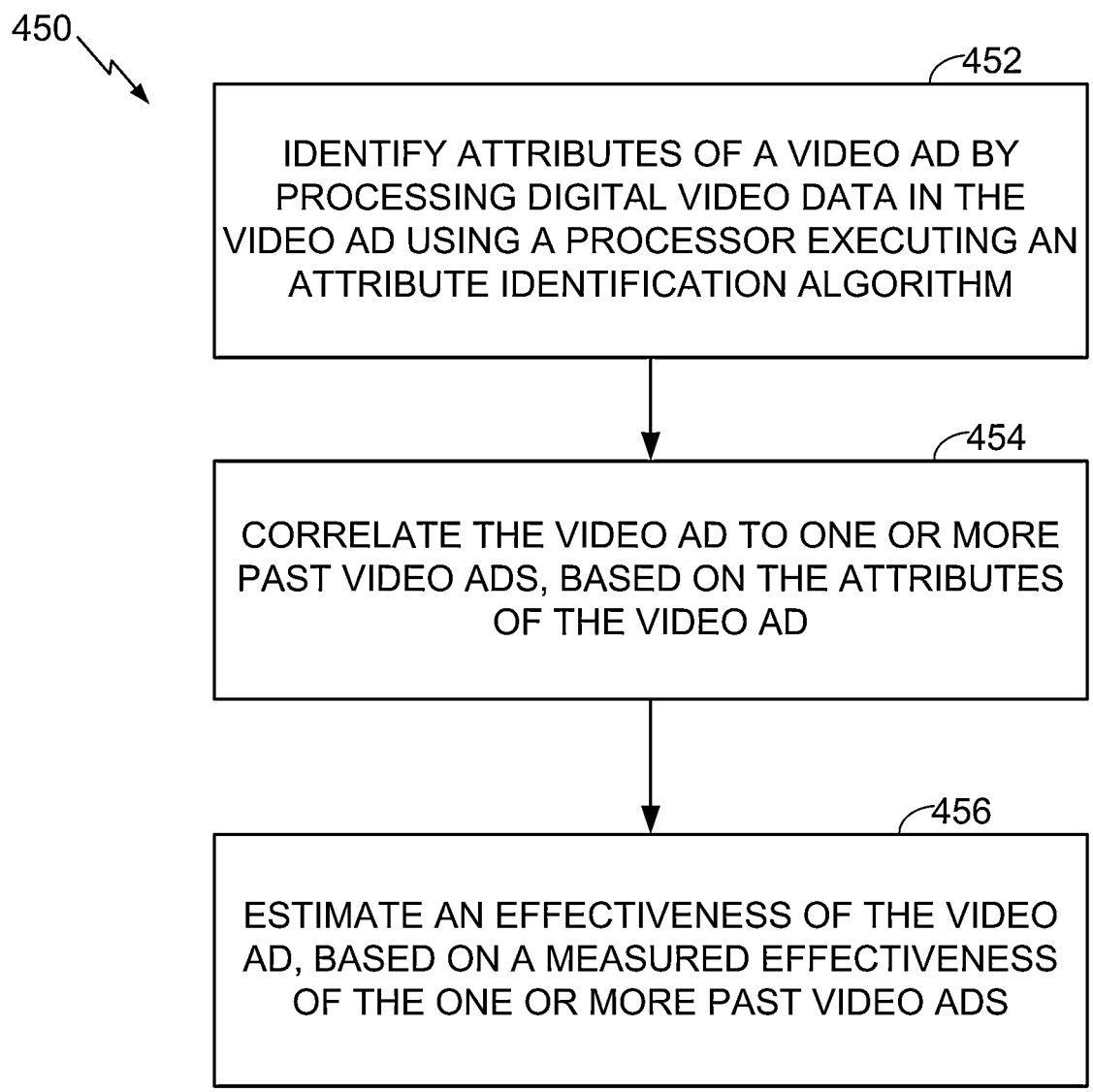
FIG. 4E shows a method for predictive advertising effectiveness analysis.

Once analyzing previously viewed video ads, particular embodiments may analyze new ads. In FIG. 4E, a computer may perform a method 450 for predictive advertising effectiveness analysis. The method 450 may include, at 452, identifying attributes of a video ad by processing digital video data in the video ad using a processor executing an attribute identification algorithm. The attribute identification algorithm may operate to identify numerous different attributes. The method 450 may further include, at 454, correlating the video ad to one or more past video ads based on the attributes of the video ad. The method 450 may further include, at 456, estimating an effectiveness of the video ad based on a measured effectiveness of the one or more past video ads. One method for measuring effectiveness is using the model based on the measured effectiveness of the one or more previously-viewed video ads, and then predicting the effectiveness of a new video ad based on the model and attributes/correlation coefficients of the new ad. Effectiveness may be measured by a quantifiable measure, for example, a click-through rate, sell-through rate, a referral rate, brand recall, or some combination of these or other measures. The aggregate effectiveness is not the measured effectiveness of one ad, but the learned knowledge about the relationship between each attribute and effectiveness. An example of predicting the effectiveness will be described in more detail below.

With reference to FIGS. 5-10, several additional operations 500, 600, 700, 800 and 900 are depicted for predictive video advertising effectiveness analysis, which may be performed by a computer server, alone or in combination with a client device and/or another server. One or more of operations 500, 600, 700, 800 and 900 may optionally be performed as part of method 450. The elements operations 500, 600, 700, 800 and 900 may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 450 includes at least one of the operations 500, 600, 700, 800 and 900, then the method 450 may terminate after the at least one operation, without necessarily having to include any subsequent downstream operation(s) that may be illustrated.

In an aspect, with reference to FIG. 5, the method 450 may further include additional operations 500 in connection with executing the identification algorithm 452. The additional operations may include, at 510, determining a meaning for words or phrases appearing in the video ad, using at least one of audio analysis or image analysis. In the alternative, or in addition, the method 450 may further include, at 520, characterizing a literary tone of the video ad based at least in part on the meaning. In the alternative, or in addition, the method 450 may further include, at 530, identifying a call to action contained in the video ad based at least in part on the meaning. Here, a "call to action" refers to a verbal or textual request directed to the user, for example, "Call 555-1212 now!" In the alternative, or in addition, the method 450 may further include, at 540 identifying an advertising objective based at least in part on the meaning. For further example, the method 450 may further include, at 550, identifying at least one brand name or trademark appearing in the video ad based at least in part on the meaning.

Figure 6:
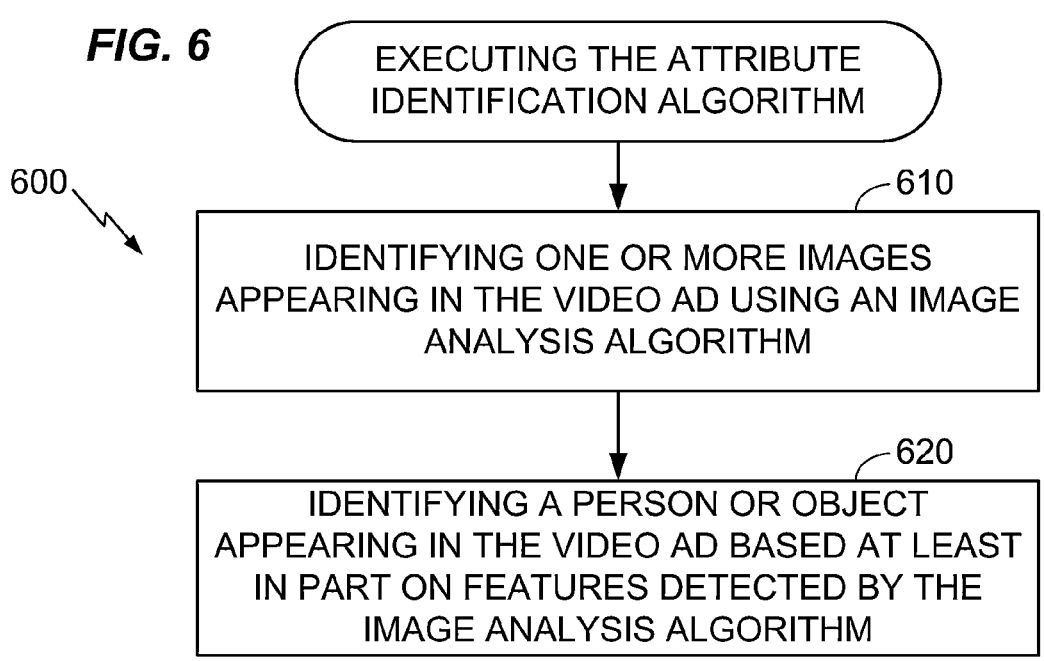
FIG. 6 shows additional operations in connection with executing the identification algorithm.

In related aspects, with reference to FIG. 6, the method may include additional operations 600 for in connection with executing the identification algorithm 452. The method 450 may further include, at 610, identifying one or more images appearing in the video ad using an image analysis algorithm. The method 450 may further include, at 620, identifying a person or object appearing in the video ad based at least in part on features detected by the image analysis algorithm. For example, the algorithm may detect an actor's face, a gender or demographic type of a person, an animal, or a type of inanimate object.

Figure 7:
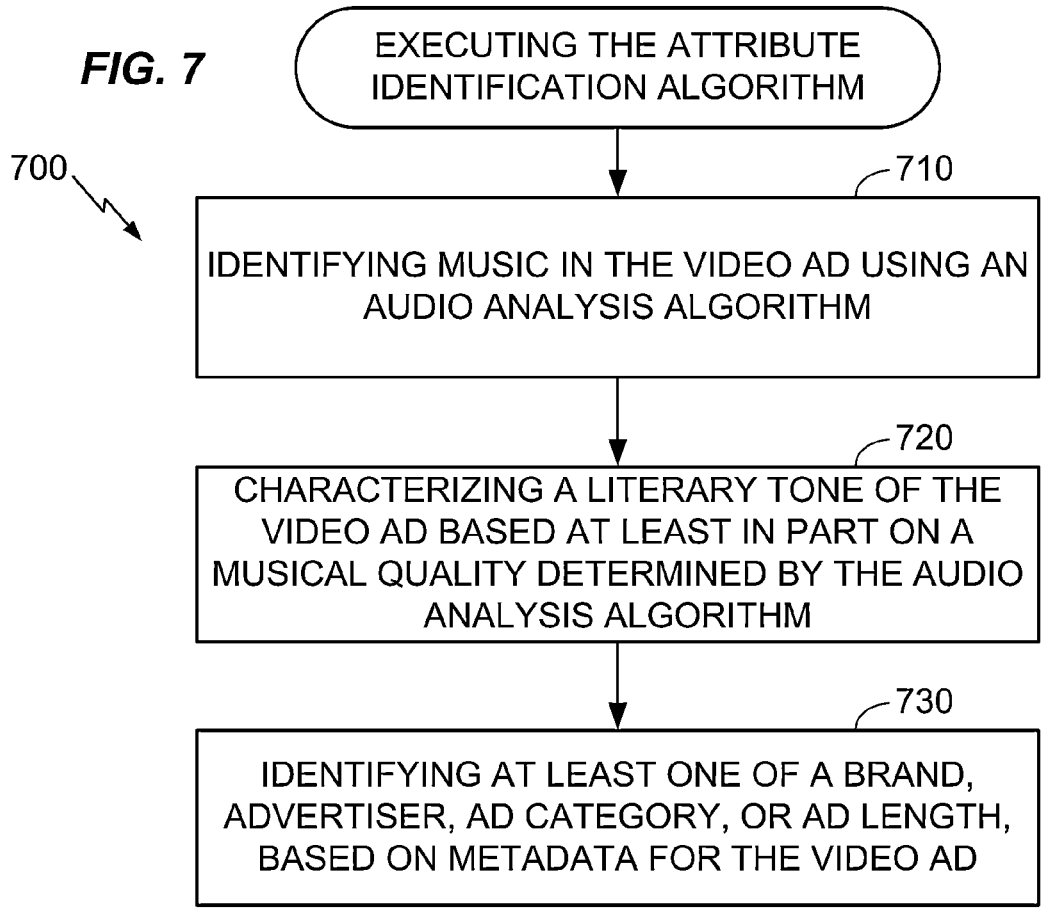
FIG. 7 shows additional operations in connection with executing the identification algorithm.

In related aspects, with reference to FIG. 7, the method may include additional operations 700 for in connection with executing the identification algorithm 452. The method 450 may further include, at 710, identifying music in the video ad using an audio analysis algorithm. The method 450 may further include, at 720, characterizing a literary tone of the video ad based at least in part on a musical quality determined by the audio analysis algorithm. The method 450 may further include, at 730, identifying at least one of a brand, advertiser, ad category, or ad length, based on metadata for the video ad.

FIG. 8A depicts a simplified flowchart 800 for analyzing new ads according to one embodiment. Analysis module 108 predicts the effectiveness of the new ad based on information from previously-viewed video ads. At 802, analysis module 108 receives a new ad. For example, the new ad may be received from an advertiser.

At 804, analysis module 108 determines attributes of the new ad. For example, analysis module 108 performs the same analysis described above with respect to the previously-viewed video ads. In one example, visual, textual, and audio analysis is performed to determine attributes of the new ad.

At 806, analysis module 108 predicts the effectiveness of the new ad using the model that was built using the previously-viewed video ads. For example, analysis module 108 inputs the attributes that were determined for the new ad into the model to predict the effectiveness.

Figure 8B:
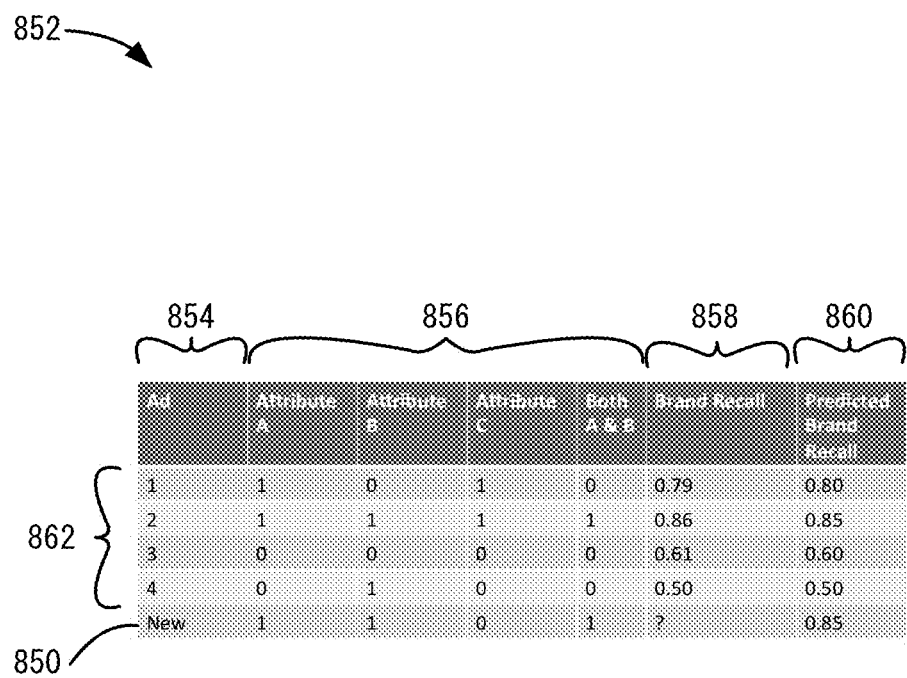
FIG. 8B shows an example of a prediction for an attribute according to one embodiment.

FIG. 8B shows an example of a prediction for an attribute according to one embodiment. In the example, the effectiveness of brand recall is predicted for a new ad shown at 850. In a table 852, the ads are shown in a column 854. At 856, various attributes of A, B, C, and both attributes A and B are shown. At 858, a measured score for the brand recall is shown and at 860, the predicted brand recall score is shown. Previously-viewed video ads are shown in rows 862. Ad #1 includes the attributes A and C, but does not include the attributes B and both A and B. Also, the measured brand recall for ad #1 was measure at 0.79 and the predicted brand recall was calculated at 0.80. The measured brand recall may have been measured based on statistics from when the previously-viewed video ads were shown. The predicted brand recall is determined based on the model. Similarly, ads #2, #3, and #4, have information for which attributes are included in these ads and also scores for the measured brand recall and predicted brand recall.

At 850, table 852 includes values for the attributes that are included in the new ad. In this example, the new ad includes attributes A, B, and both A and B. Further, the predicted brand recall is calculated as 0.85. The predicted brand recall may be determined based on the information from the previously-viewed video ads shown at 862. From the previously-viewed video ads, the following may be determined: a) a predicted brand recall is 0.6 when no attributes are known (referred to as the "base predicted brand recall"); b) If the new ad has attribute a, the new ad probably has 0.2 higher brand recall; c) if the new ad has attribute b, the new ad probably has 0.1 lower brand recall; d) it does not matter whether the new ad has attribute c or not; e) if the new ad has both attribute A and attribute B, the new ad probably has 0.15 higher brand recall. In this example, the correlation coefficients are 0.6, 0.2, −0.1 and 0.15, which are applied to the attributes of the new ad to measure the effectiveness of the new ad based on previous knowledge. The correlation coefficients rate the effect the attribute has on the effectiveness of the ad based on previously-viewed video ads. The brand recall is determined using the base predicted brand recall and adding the effect from whichever attributes are associated with the new ad to the base predicted brand recall. For example, the correlation coefficient states that a new ad probably has a 0.2 higher brand recall than the base predicted brand recall if the new ad has attribute A, which means the brand recall is now 0.8. Then, the determination that if the new ad has attribute B, the new ad probably has a 0.1 lower brand recall, decreases the brand recall of 0.8 by 0.1 to 0.7. Also, for the attribute both A and B, it may be determined that the new ad having the attribute both A and B may be 0.15 above the predicted brand recall. In this case, the predicted brand recall is increased by 0.15 to 0.85. Finally, it may be determined that it does not matter whether an ad has attribute C or not. This assumption may be determined automatically by analyzing the effect of attribute C or by user input. It should be noted that the correlation coefficients may be determined using information for many more previously-viewed video ads and that this is a simplified example. In summary, the correlation coefficients are 0.6, 0.2, −0.1, and 0.15. Analysis module 108 predicts the brand recall as follows: 0.6+0.2*A−0.1*B+0*C+0.15*(A and B)=0.6+0.2−0.1+0+0.15=0.85. In this example, the correlation coefficients are multiplied by the presence, absence (or no effect on effectiveness) value. Different methods of using the correlation coefficients will be appreciated.

For example, machine learning algorithms determine the coefficients. For example, the coefficients could be inferred using a linear regression algorithm, but other machine learning algorithms may be used. In the example, the brand recall of an ad i is $y_i$, and the features of the ad i are $x_i$. The features of an ad are extracted from the ad's attributes. One feature may be a number extracted from the attribute itself, or a number extracted from several attributes. A linear regression algorithm may determine the coefficients w as follows:

$$w = (X^T X)^{-1} X^T y,$$

where $$X = \begin{bmatrix} x_1 \\ x_2 \\ \dots \\ x_N \end{bmatrix}$$

and $$y = \begin{bmatrix} y_1 \\ y_2 \\ \dots \\ y_N \end{bmatrix},$$

and N is the number of ads. For example, if there are two attributes A and B for each ad, four features may be defined for each ad. The first/second/third feature is "1" if the ad has attribute A/B/both A and B, and "0" if no. The fourth feature is always "1" for every ad to represent a global bias. As shown in the following table, N is 5, y is the brand recall and x summarizes the attribute values:

$$y = \begin{bmatrix} 0.59 \\ 0.51 \\ 0.79 \\ 0.87 \\ 0.81 \end{bmatrix},$$

$$X = \begin{bmatrix} 0 & 0 & 0 & 1 \\ 0 & 1 & 0 & 1 \\ 1 & 0 & 0 & 1 \\ 1 & 1 & 1 & 1 \\ 1 & 0 & 0 & 1 \end{bmatrix},$$

and the machine learning algorithm determines the coefficients as:

$$w = \begin{bmatrix} 0.21 \\ -0.08 \\ 0.15 \\ 0.59 \end{bmatrix}.$$

Then the machine learning algorithm can predict the brand recall of the ad i using $$\hat{y}_i = x_i^T w,$$

where $\hat{y}_i$ is the predicted brand recall. That is, the predicted brand recall=0.59+0.21 if the ad has attribute A, −0.08 if the ad has attribute B+0.15 if the ad has both attributes A and B. Table 1 summarizes the results.

TABLE 1

| Ads | Having Attribute A | Having Attribute B | Brand Recall | Predicted Brand recall |
| --- | --- | --- | --- | --- |
| 1 | 0 | 0 | 0.59 | 0.59 |
| 2 | 0 | 1 | 0.51 | 0.51 |
| 3 | 1 | 0 | 0.79 | 0.80 |
| 4 | 1 | 1 | 0.87 | 0.87 |
| 5 | 1 | 0 | 0.81 | 0.80 |

At 808, particular embodiments compare the new ad to previous ads that are in a related segment to the new ad. For example, previously-viewed video ads in the same related segment, such as vehicles, that have a higher effectiveness than the new ad are determined. The attributes for the previously-viewed video ads are then compared to the attributes of the new ad. For example, analysis module 108 determines a difference between the attributes for the previously-viewed video ads and the new ad. In one example, the previously-viewed video ads that have a better predicted effectiveness may have the call-to-action attribute, a male attribute, and music in the ad. However, the new ad may have a male, an animal, and music in the ad. In another embodiment, the model predicted which attributes have a positive impact. The attributes not included in the new ad that had a positive impact on effectiveness in previous ads may be determined as attributes that might increase the effectiveness of the new ad.

Further, attributes that might bring down the effectiveness of the new ad may be determined. For example, analysis module 108 determines attributes included in the new ad that have a negative correlation as attributes that lower the effectiveness. In the example above, attribute B had a −0.1 correlation and is a negative attribute. In another embodiment, negative ads that have lower effectiveness than the new ad may include an animal in the ad. It may be determined that this brings down the effectiveness.

Once the comparison is made, at 810, particular embodiments determine suggestions for the new ad. For example, the differences between higher rated previously viewed video ads and the new ad may be used to determine what could improve the effectiveness (or bring down the effectiveness) of the new ad. For example, it may be determined that a call-to-action may be included in the new ad to increase the effectiveness. This is because a previously-viewed ad that had a higher effectiveness included the call-to-action attribute. Analysis module 108 outputs the suggestions. For example, analysis module 108 may send the suggestions to the advertisers to add positive attributes and remove negative attributes.

Figure 9:
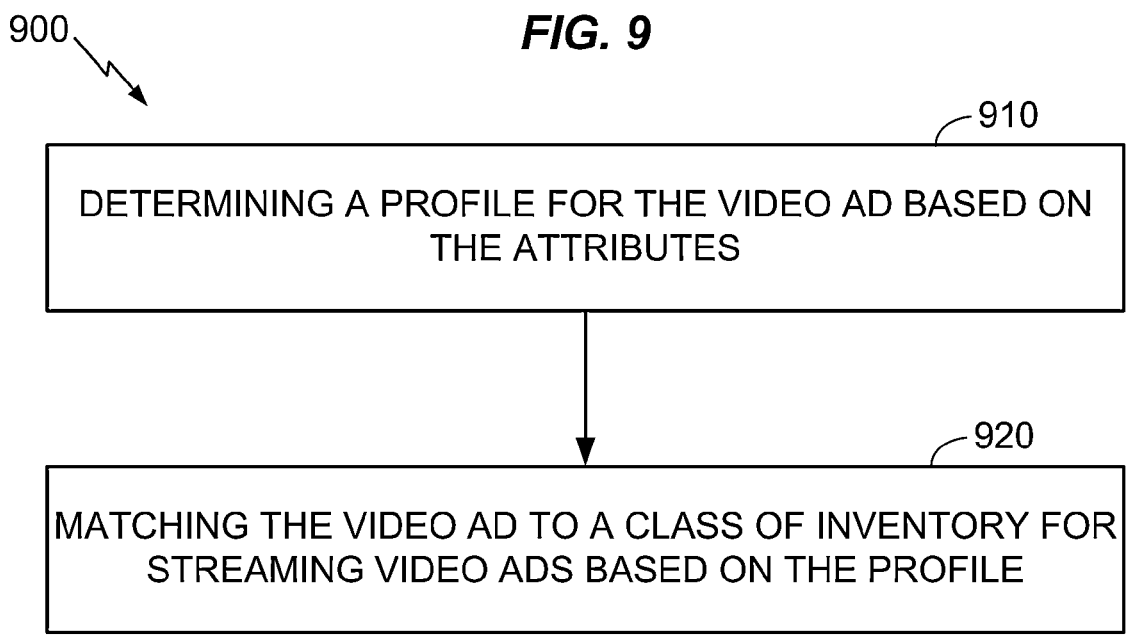
FIG. 9 shows additional operations for processing a video ad to improve effectiveness.

In other aspects, with reference to FIG. 9, the method 450 may include additional operations 900 for processing a video ad to improve effectiveness. The method 450 may further include, at 910, determining a profile for the new ad based on the attributes. The profile may describe the new ad, such as a related segment. The method 450 may further include, at 920, matching the new ad to a class of inventory for ads based on the profile. For example, ads with different attributes might be better suited for different groups of users. For example, an attribute of a "persuading tone" may be suitable for users that are older than 30, but an attribute of "call to action" may be suitable for users that are younger than 30. This step further improves the effectiveness by delivering the ads to a more suitable user group.

Figure 10:
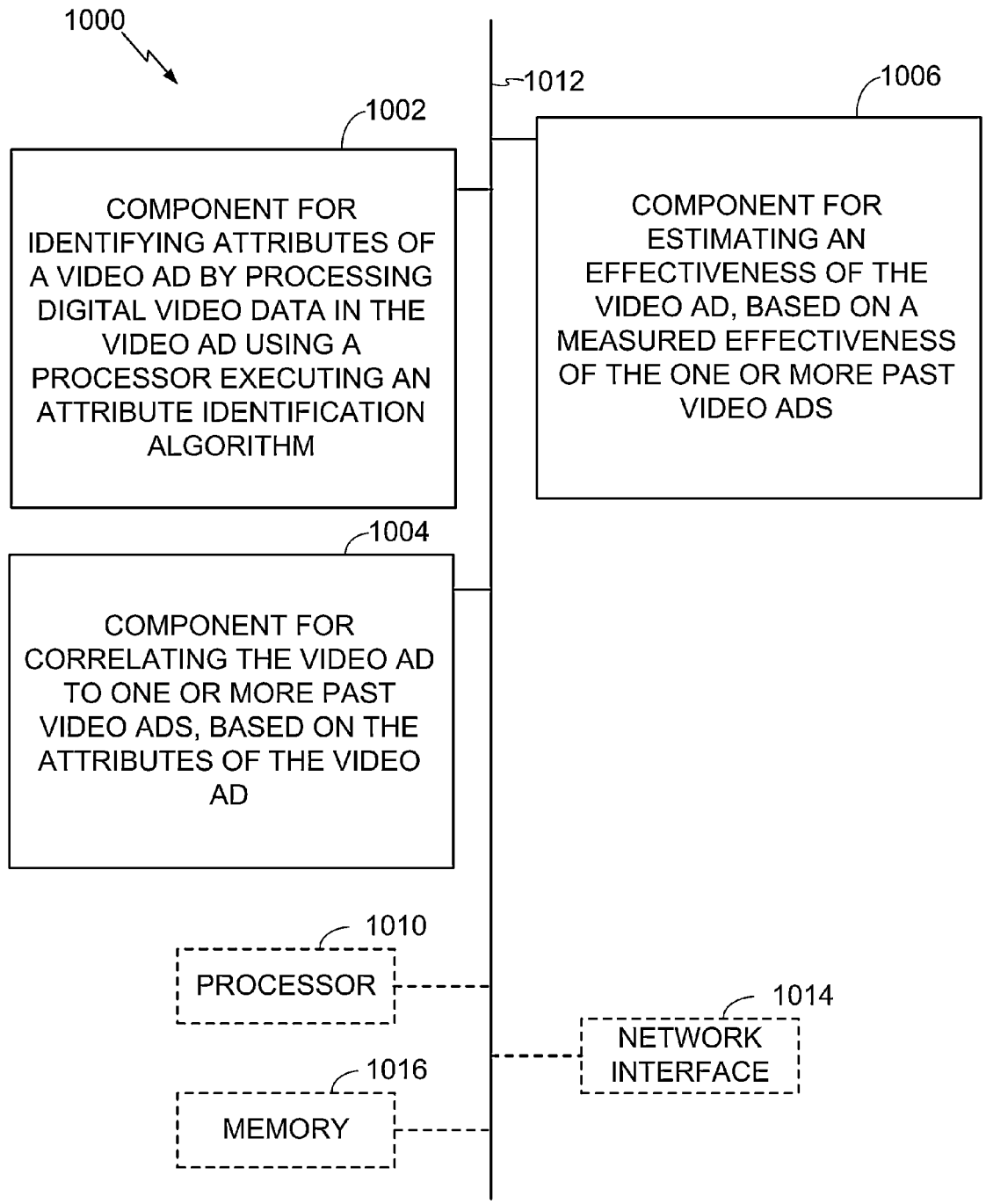
FIG. 10 shows an apparatus that may be configured as computer server, or the like, for providing estimated effectiveness of video ads.

With reference to FIG. 10, there is provided an apparatus 1000 that may be configured as computer server, or the like, for providing estimated effectiveness of video ads. The apparatus 1000 may include functional blocks that can represent functions implemented by a processor, software, or combination thereof (e.g., firmware).

As illustrated, in one embodiment, the apparatus 1000 may include an electrical component or means 1002 for identifying attributes of a video ad by processing digital video data in the video ad using a processor executing an attribute identification algorithm. For example, the electrical component or means 1002 may include at least one control processor 1010 coupled to a memory component 1016. The control processor may operate an algorithm, which may be held as program instructions in the memory component. The algorithm may include, for example, one or more of the algorithms for identifying attributes as disclosed in the detailed disclosure above in connection with FIGS. 5-7.

The apparatus 1000 may further include an electrical component or module 1004 for correlating the video ad to one or more past video ads, based on the attributes of the video ad. For example, the electrical component or means 1004 may include at least one control processor 1010 coupled to a memory component 1016. The control processor may operate an algorithm, which may be held as program instructions in the memory component. The algorithm may include, for example, profiling the advertisement based on a set of attribute values, and matching a profile of the advertisement to profiles for previously-viewed video ads to identify a set of similar prior ads.

The apparatus 1000 may further include an electrical component or module 1006 for estimating an effectiveness of the video ad, based on a measured effectiveness of the one or more past video ads. For example, the electrical component or means 1006 may include at least one control processor 1010 coupled to a memory component 1016. The control processor may operate an algorithm, which may be held as program instructions in the memory component. The algorithm may include, for example, taking a aggregate measure, for example an average or median, of measured effectiveness for an identified set of similar previously-viewed video ads.

In related aspects, the apparatus 1000 may optionally include a processor component 1010 having at least one processor, in the case of the apparatus 1000 configured as a video processing apparatus, alone or in combination with a client device. The processor 1010, in such case may be in operative communication with the components 1002-1006 or similar components via a bus 1012 or similar communication coupling. The processor 1010 may effect initiation and scheduling of the processes or functions performed by electrical components 1002-1006.

In further related aspects, the apparatus 1000 may include a network interface component 1014 enabling communication between a client and a server. The apparatus 1000 may optionally include a component for storing information, such as, for example, a memory device/component 1016. The computer readable medium or the memory component 1016 may be operatively coupled to the other components of the apparatus 1000 via the bus 1012 or the like. The memory component 1016 may be adapted to store computer readable instructions and data for implementing the processes and behavior of the components 1002-1006, and subcomponents thereof, or the processor 1010, or the methods disclosed herein. The memory component 1016 may retain instructions for executing functions associated with the components 1002-1006. While shown as being external to the memory 1016, it is to be understood that the components 1002-1006 can exist within the memory 1016.

Figure 11:
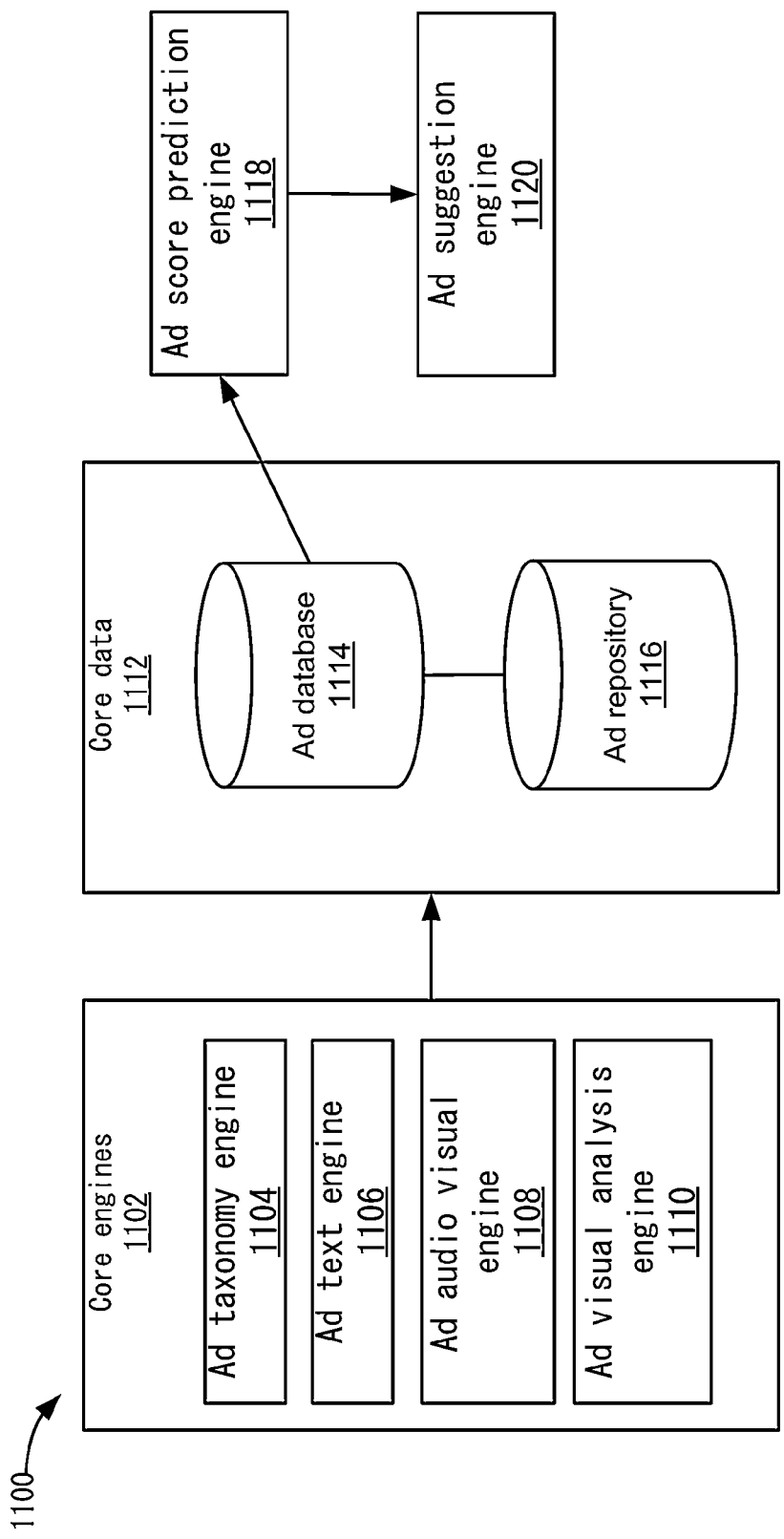
FIG. 11 depicts an example of a system for measuring the effectiveness of ads according to one embodiment.

FIG. 11 depicts an example of a system 1100 for measuring the effectiveness of ads according to one embodiment. Core engines 1102 include various engines that can analyze ads. For example, an ad taxonomy engine 1104 determines the taxonomy of attributes that could be included in the ad. An ad text analysis engine 1106 may analyze the text of an ad, an ad audio analysis engine 1108 analyzes the audio in the ad, and an ad visual analysis engine 1110 analyzes visual objects in the ad. These engines determine the attributes associated with an ad. Data is then stored in a core database 1112. Core database 1112 includes an ad database 1114 that stores the information for the attributes for the previously-viewed video ads and also new ads. The previously-viewed video ads and new ads that have been analyzed are stored in an ad repository 1116.

An ad score prediction engine 1118 predicts the effectiveness for a new ad. For example, the predicted effectiveness may be determined as described above.

An ad suggestion engine 1120 then determines suggestions for attributes for the new ad. For example, attributes that could be added to the new ad or attributes that could be deleted from the new ad are determined and provided to an advertiser.

It should be understood that the specific order or hierarchy of steps in the processes disclosed are merely examples. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The term "non-transitory computer-readable medium" as used herein may refer to any medium that participates in holding instructions for execution by a processor or that stores data for processing by a computer. Such a medium may take many forms, including but not limited to, non-volatile media, volatile media, and temporary storage media (e.g., cache memory). Non-volatile media may include optical or magnetic disks, such as a storage device. Volatile media may include dynamic memory, e.g., RAM. Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, any other memory card, chip, or cartridge, or any other memory medium from which a computer can read.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for predicting effectiveness of video advertising, the method comprising:
sending videos to one or more client devices, wherein video ads are sent to the one or more client devices and viewed during ad slots in the videos by one or more users during the playing of the videos;
identifying, by a computing device, attributes of a set of previously viewed video ads by automatically analyzing video data of the set of previously viewed video ads, wherein the set of previously viewed ads are from the video ads played in the ad slots;
measuring, by the computing device, a video ad metric for the set of previously viewed video ads based on data received in response to the sending of the set of previously viewed video ads to the one or more client devices;
generating, by the computing device, a machine learning algorithm to predict the video ad metric for new video ads using the attributes of the set of previously viewed video ads and the measured video ad metric for the set of previously viewed video ads;
identifying, by the computing device, attributes of a new video ad by automatically analyzing video data in the new video ad using an attribute identification algorithm;
using, by the computing device, the machine learning algorithm to determine correlation coefficients for features of the set of previously viewed video ads, wherein the features represent different combinations of the attributes, and wherein the machine learning algorithm comprises:

$$w = (X^T X)^{-1} X^T y,$$

where $$X = \begin{bmatrix} x_1 \\ x_2 \\ \dots \\ x_N \end{bmatrix}$$

and $$y = \begin{bmatrix} y_1 \\ y_2 \\ \dots \\ y_N \end{bmatrix},$$

and $$\hat{y}_i = x_i^T w,$$

where $\hat{y}_i$ is a predicted video advertising metric, w represents the correlation coefficients, x represents values for the features, and y represents values associated with the measured video ad metrics for the set of previously viewed ads;
inputting, by the computing device, the features of the new video ad into the machine learning algorithm to estimate the predicted video advertising metric of the new video ad based on the correlation coefficients and the features of the new video ad.

2. The method of claim 1, wherein using the attribute identification algorithm comprises determining a meaning for words or phrases appearing in the new video ad using at least one of audio analysis or visual analysis.

3. The method of claim 2, wherein using the attribute identification algorithm further comprises characterizing a call to action contained in the new video ad, an advertising objective, at least one brand name or trademark appearing in the new video ad based at least in part on the meaning.

4. The method of claim 1, wherein using the attribute identification algorithm comprises identifying one or more images appearing in the new video ad using a visual analysis algorithm.

5. The method of claim 4, wherein using the attribute identification algorithm further comprises identifying a person or object appearing in the new video ad based at least in part on features detected by the visual analysis algorithm.

6. The method of claim 1, wherein using the attribute identification algorithm comprises identifying music in the new video ad using an audio analysis algorithm.

7. The method of claim 1, wherein using the attribute identification algorithm comprises identifying at least one of a brand, advertiser, ad category, or ad length based on metadata for the new video ad.

8. The method of claim 1, wherein the correlation coefficients indicate variances from a base predicted video advertising metric for each respective attribute; and
   inputting the features of the new video ad into the machine learning algorithm comprises applying the variances for the features for the new video ad to the base predicted video advertising metric.

9. The method of claim 8, wherein inputting the features of the new video ad into the machine learning algorithm comprises:
   determining which attributes have an effect on the predicted video advertising metric from attributes for the new video ad; and
   using the attributes that have the effect to estimate the predicted video advertising metric.

10. The method of claim 8, further comprising:
    determining a new attribute to add to the new video ad based on the new attribute having a correlation value that has a positive variance from the base predicted video advertising metric or determining one attribute from the attributes of the new video ad to remove based on the one attribute having a correlation value that has a negative variance from the base predicted video advertising metric.

11. The method of claim 1, further comprising determining a difference between the attributes of the new video ad and the attributes of a subset of previously viewed video ads in the one or more previously viewed video ads that have a predicted video advertising metric greater than the predicted video advertising metric of the new video ad.

12. The method of claim 1, further comprising generating one or more suggestions for improving the predicted video advertising metric value of the new video ad based on the difference, the suggestions including an attribute included in the subset of previously viewed video ads, but not in the attributes for the new video ad.

13. The method of claim 1, further comprising determining a profile for the new video ad based on the attributes for the new video ad.

14. The method of claim 13, further comprising matching the new video ad to a class of inventory for streaming video ads based on the profile.

15. An apparatus configured to predict video advertising metric of video advertising, the apparatus comprising:
    at least one computer processor configured for:
       sending videos to one or more client devices, wherein video ads are sent to the one or more client devices and viewed during ad slots in the videos by one or more users during the playing of the videos;
       identifying attributes of a set of previously viewed video ads by automatically analyzing video data of the previously viewed video ads, wherein the set of previously viewed ads are from the video ads played in the ad slots;
       measuring a video ad metric for the set of previously viewed video ads based on data received in response to the sending of the set of previously viewed video ads to the one or more client devices;
       generating a machine learning algorithm to predict the video ad metric for new video ads using the attributes of the set of previously viewed video ads and the measured video ad metric for the set of previously viewed video ads;
       identifying attributes of a new video ad by automatically analyzing video data in the new video ad using an attribute identification algorithm;
       using, by the computing device, the machine learning algorithm to determine correlation coefficients for features of the set of previously viewed video ads, wherein the features represent different combinations of the attributes, and wherein the machine learning algorithm comprises:

$$w = (X^T X)^{-1} X^T y,$$

where $$X = \begin{bmatrix} x_1 \\ x_2 \\ \ldots \\ x_N \end{bmatrix}$$

and $$y = \begin{bmatrix} y_1 \\ y_2 \\ \ldots \\ y_N \end{bmatrix},$$

and $$\hat{y}_i = x_i^T w,$$

where $\hat{y}_i$ is a predicted video advertising metric, w represents the correlation coefficients, x represents values for the features, and y represents values associated with the measured video ad metrics for the set of previously viewed ads;
   inputting, by the computing device, the features of the new video ad into the machine learning algorithm to estimate the predicted video advertising metric of the new video ad based on the correlation coefficients and the features of the new video ad; and
   a memory coupled to the at least one processor for storing data.

16. The apparatus of claim 14, wherein the correlation coefficients indicate variances from a base predicted video advertising metric for each respective attribute; and
    inputting the features of the new video ad into the machine learning algorithm comprises applying the variances for the features for the new video ad to the base predicted video advertising metric.

17. The apparatus of claim 15, wherein calculating comprises:
    determining which attributes have an effect on the predicted video advertising metric value from attributes for the new video ad; and
    using the attributes that have the effect to calculate the predicted video advertising metric value.

18. The apparatus of claim 15, wherein the processor is further configured for determining a new attribute to add to the new video ad based on the new attribute having a correlation value that has a positive variance from a base predicted video advertising metric or determining one attribute from the attributes of the new video ad to remove based on the one attribute having a correlation value that has a negative variance from the base predicted video advertising metric.

19. The apparatus of claim 15, wherein the processor is further configured for:
   determining a difference between the attributes of the new video ad and the attributes of a subset of previously viewed video ads in the one or more previously viewed video ads that have a predicted video advertising metric greater than the predicted video advertising metric of the new video ad; and
   generating one or more suggestions for improving the predicted video advertising metric of the new video ad based on the difference, the suggestions including an attribute included in the subset of previously viewed video ads, but not in the attributes for the new video ad.

20. A non-transitory computer-readable medium holding coded instructions predicting effectiveness of video advertising, wherein the instructions when executed by a computer processor, cause a computer to perform the operations of:
   sending videos to one or more client devices, wherein video ads are sent to the one or more client devices and viewed during ad slots in the videos by one or more users during the playing of the videos;
   identifying attributes of a set of previously viewed video ads by automatically analyzing video data of the previously viewed video ads, wherein the set of previously viewed ads are from the video ads played in the ad slots;
   measuring a video ad metric for the set of previously viewed video ads based on data received in response to the sending of the set of previously viewed video ads to the one or more client devices;
   generating a machine learning algorithm to predict the video ad metric for new video ads using the attributes of the set of previously viewed video ads and the measured video ad metric for the set of previously viewed video ads;
   identifying attributes of a new video ad by automatically analyzing video data in the new video ad using an attribute identification algorithm;
   using, by the computing device, the machine learning algorithm to determine correlation coefficients for features of the set of previously viewed video ads, wherein the features represent different combinations of the attributes, and wherein the machine learning algorithm comprises:

$$w = (X^T X)^{-1} X^T y,$$

where $$X = \begin{bmatrix} x_1 \\ x_2 \\ \ldots \\ x_N \end{bmatrix}$$

and $$y = \begin{bmatrix} y_1 \\ y_2 \\ \ldots \\ y_N \end{bmatrix},$$

and $$\hat{y}_i = x_i^T w,$$

where $\hat{y}_i$ is a predicted video advertising metric, w represents the correlation coefficients, x represents values for the features, and y represents values associated with the measured video ad metrics for the set of previously viewed ads;
   inputting, by the computing device, the features of the new video ad into the machine learning algorithm to estimate the predicted video advertising metric of the new video ad based on the correlation coefficients and the features of the new video ad.

* * * * *